United States Patent
Sylvain

(10) Patent No.: US 7,039,170 B1
(45) Date of Patent: May 2, 2006

(54) AUTOMATED DATA TRANSFER IN ASSOCIATION WITH A VOICE CALL

(75) Inventor: Dany Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 129 days.

(21) Appl. No.: 10/324,609

(22) Filed: Dec. 20, 2002

(51) Int. Cl.
*H04M 11/00* (2006.01)

(52) U.S. Cl. ............................ 379/93.23; 379/88.13; 379/142.06

(58) Field of Classification Search ............ 379/93.12, 379/102.03, 88.13, 265.09, 142.1, 142.17, 379/142.16, 142.13, 201.06, 201.08, 201.09, 379/201.01, 93.23, 142.06; 707/10
See application file for complete search history.

(56) References Cited

U.S. PATENT DOCUMENTS 6,438,599 B1 * 8/2002 Chack ..................... 709/229
6,459,782 B1 * 10/2002 Bedrosian et al. ..... 379/201.08
2003/0115203 A1 * 6/2003 Brown et al. ............... 707/10

* cited by examiner

*Primary Examiner*—Fan Tsang
*Assistant Examiner*—Olisa Anwah
(74) *Attorney, Agent, or Firm*—Withrow & Terranova, PLLC

(57) ABSTRACT

The present invention provides for efficient delivery of information between parties associated with a voice call. When a caller initiates a call to the called party, infrastructure is in place to access information associated with the caller and called party and exchange the information between the multimedia clients associated with the parties. The delivery of the information may be fully automated, or may require authorization by the parties owning the information. Further, information delivery may take place in multiple stages, wherein automated information is initially provided and on-demand information, which requires authorization by the party owning the information, is sent to the other party's multimedia client upon receiving such authorization. Preferably, the address to a location capable of providing the information is initially delivered to the multimedia clients, which can request the information based on the address as desired by the parties involved in the call.

31 Claims, 16 Drawing Sheets

AUTOMATED DATA TRANSFER IN ASSOCIATION WITH A VOICE CALL

FIELD OF THE INVENTION

The present invention relates to communications, and in particular to delivering information in association with a voice call.

BACKGROUND OF THE INVENTION

There are many instances in which it would be beneficial to download information from one party to another in association with a voice call between those parties. For example, retailers and restaurateurs could benefit from automatically offering operating hours, information on specials, or menu information to people calling their establishments. Further, both individuals and business owners could benefit by being able to provide location information or driving directions to their locations upon receiving a call from a caller.

Although there is a growing trend to associate multimedia-capable devices with voice terminals, such as wireline and mobile telephones, there is no technique available for readily downloading the above-mentioned types of information to a multimedia client in association with a telephone call originated from an affiliated telephone. In addition to simply providing information to a caller in an automated fashion, it would be of further benefit to allow the information provider, in most instances the called party or establishment, to be able to send more private information on demand to certain callers. In some cases, a list of authorized callers may be known, and in other cases, the offerer of information may want to authorize delivery of such information on an individual basis.

Unfortunately, there is no mechanism in place for providing automated, let alone on-demand information to a called party's multimedia client in association with a voice call, and as such, such a technique is needed to provide this functionality in an efficient and commercially viable manner.

SUMMARY OF THE INVENTION

The present invention provides for efficient delivery of information for a called party to a caller in association with a voice call. When a caller initiates a call to the called party, infrastructure is in place to access information associated with the called party and send the information to a multimedia client associated with the caller. The delivery of the information may be fully automated, or may require authorization by the called party. Further, information delivery may take place in multiple stages, wherein automated information is initially provided and on-demand information, which requires the called party's authorization, is sent to the caller's multimedia client upon receiving such authorization from the called party. The fully automated information delivery may provide information that is generally more public, while the on-demand information is information that is generally more private, and thus more protected by the called party.

Preferably, the address to a location capable of providing the information is initially delivered to the caller's multimedia client, which can request the information based on the address as desired by the caller. Further, the called party may provide a list or other profile, which defines callers to which various types of information, or addresses therefor, should be provided in association with a call in an automated or on-demand fashion.

Accordingly, when a caller initiates a call to a called party's telephony device, infrastructure is in place to determine whether to send an address for information to the caller. Typically, the address of the caller's multimedia client is identified based on the caller's telephony number, and the address of the caller's multimedia client is used to send an address at which the called party's information is stored. As such, the caller, through the multimedia client, can request the information using the address for the called party's information. As noted, the address for the called party's information may be sent to the caller's multimedia client automatically, or upon receiving instructions from the called party. Such instructions may be provided via a multimedia client or other remote device associated with the called party. The address for the information of the called party is preferably that of a data server upon which the information has been stored. Alternatively, the called party's information may be stored on the multimedia client. Further, the called party's information may be sent directly to the multimedia client in lieu of sending the address from the data server or the called party's multimedia client.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides for efficient delivery of public information and efficient user-authorized delivery of private information between a called party and a caller in association with a voice call. When a caller initiates a call to the called party, infrastructure is in place to access information associated with the called party and send the information to a multimedia client associated with the caller, or vice versa. The delivery of the information may be fully automated, or may require authorization by the caller or called party associated with this information. Further, information delivery may take place in multiple stages, wherein automated information is initially provided between the parties involved in the call and on-demand information, which requires the authorization by one of the parties associated with the information, is sent to the other party's multimedia client upon receiving such authorization. The fully automated information delivery may provide information that is generally more public, while the on-demand information is information that is generally more private, and thus more protected by the called party.

Preferably, the address to a location capable of providing the information is initially delivered to the multimedia client, which can request the information based on the address as desired. Further, the party may provide a list or other profile, which defines parties to which various types of information, or addresses therefor, should be provided in association with a call in an automated or on-demand fashion. The information may include but is not limited to a web page, media file, document file, graphics, streaming media, and pictures. Further detail is provided below in association with the description of multiple communication environments and the functionality thereof.

Figure 1:
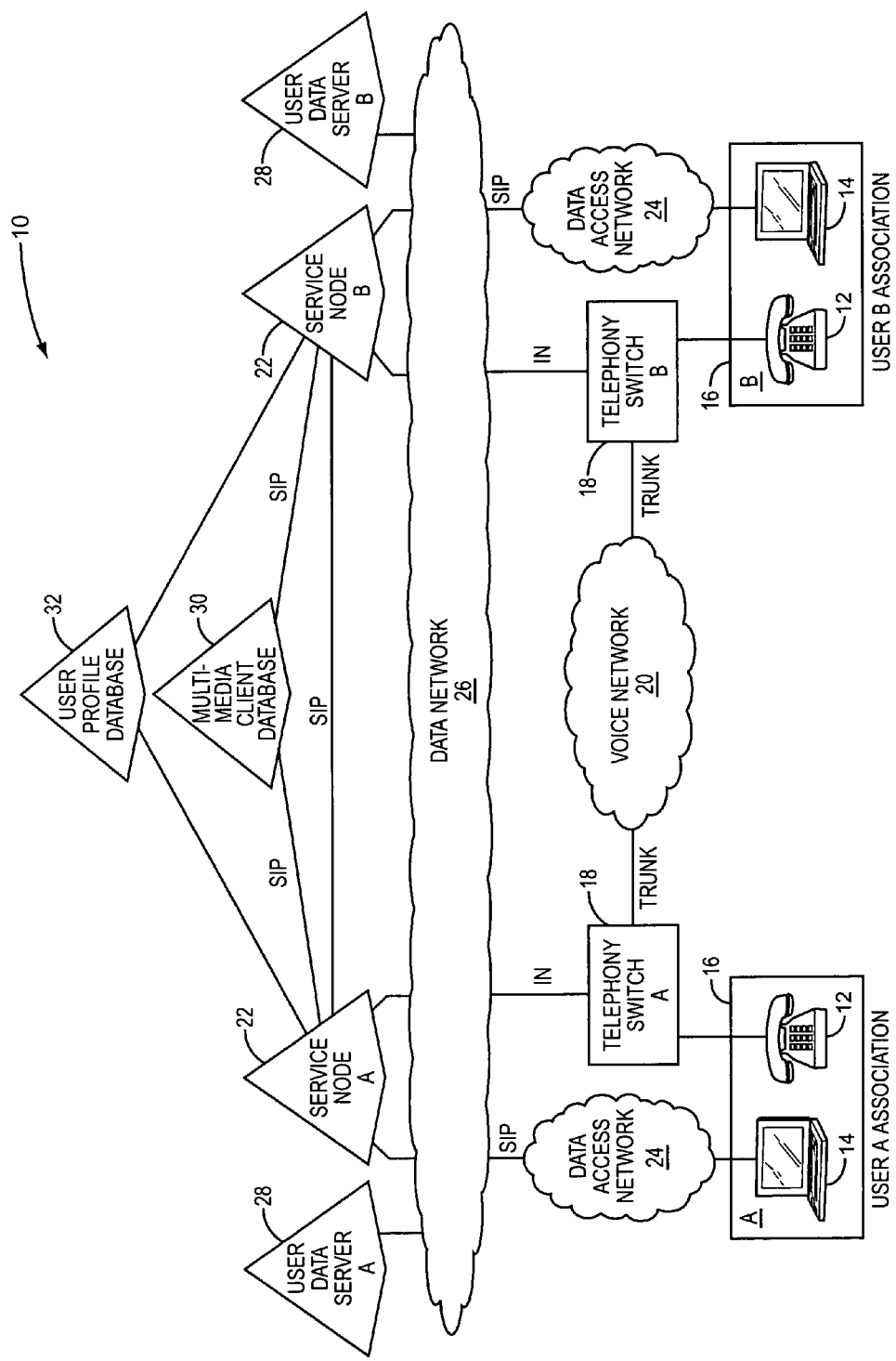
FIG. 1 is a block representation of a communication environment according to a first embodiment of the present invention.
Figure 2A:
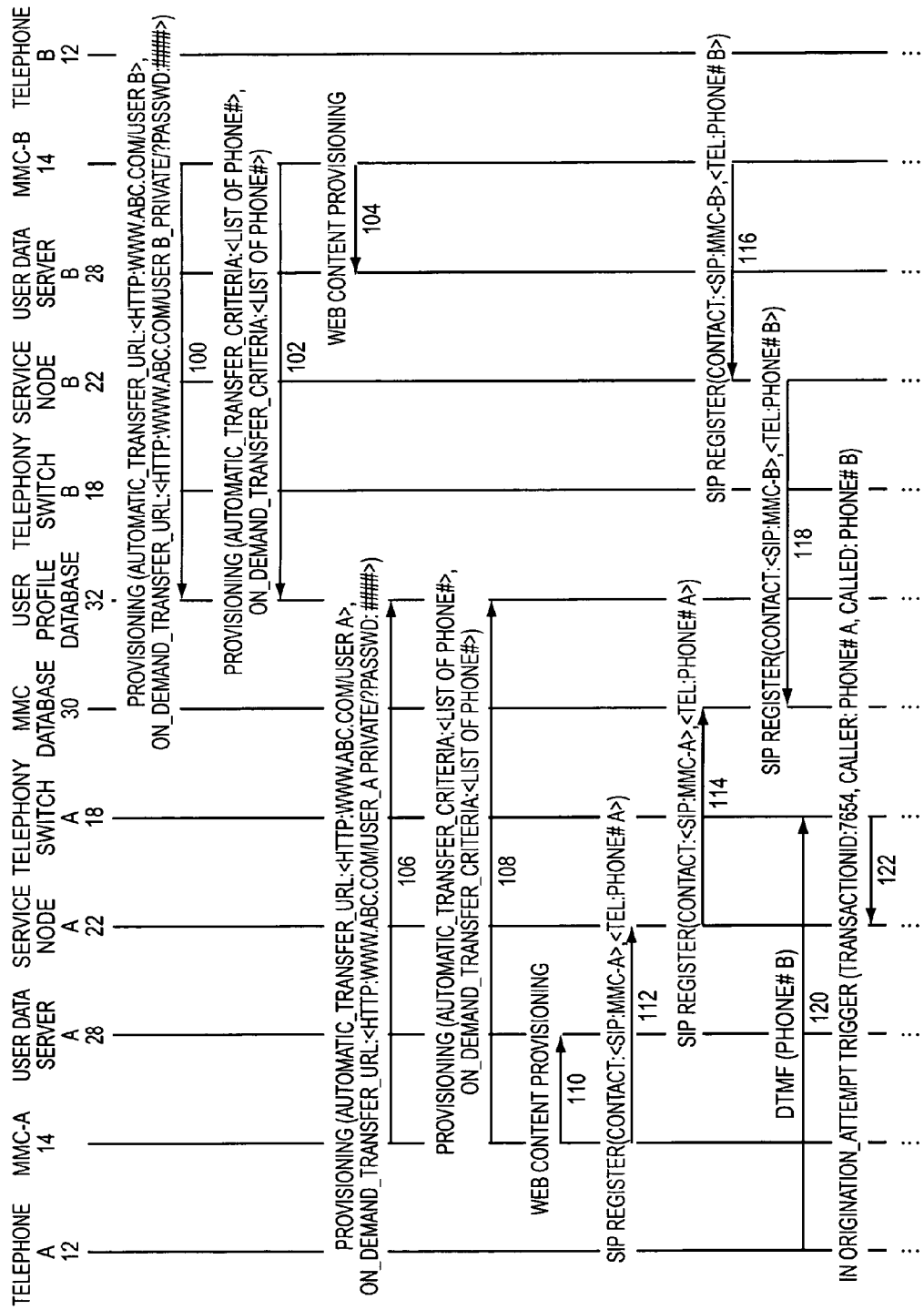
FIGS. 2A–2D are a call flow in association with the communication environment of FIG. 1.
Figure 2B:
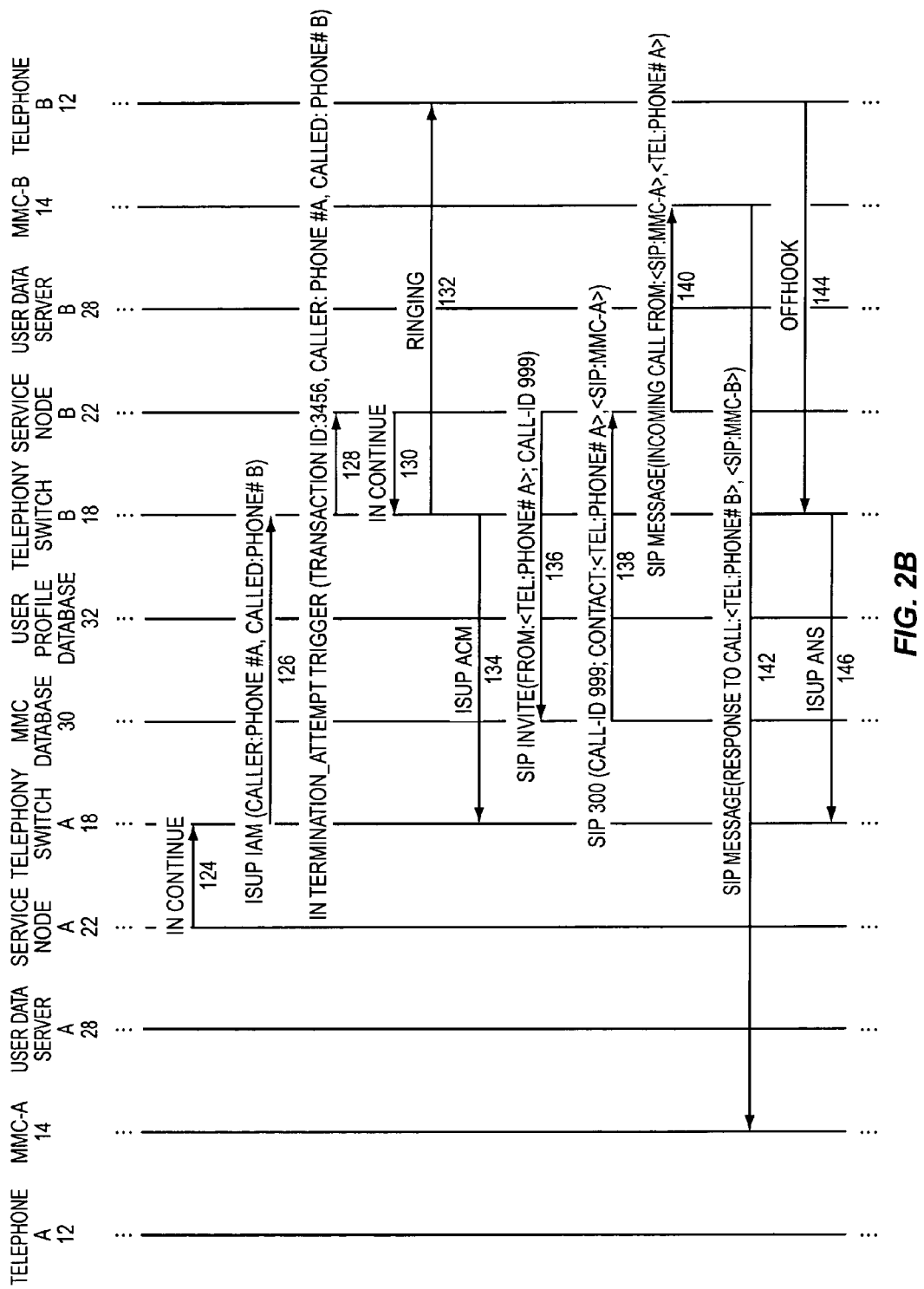
Figure 2C:
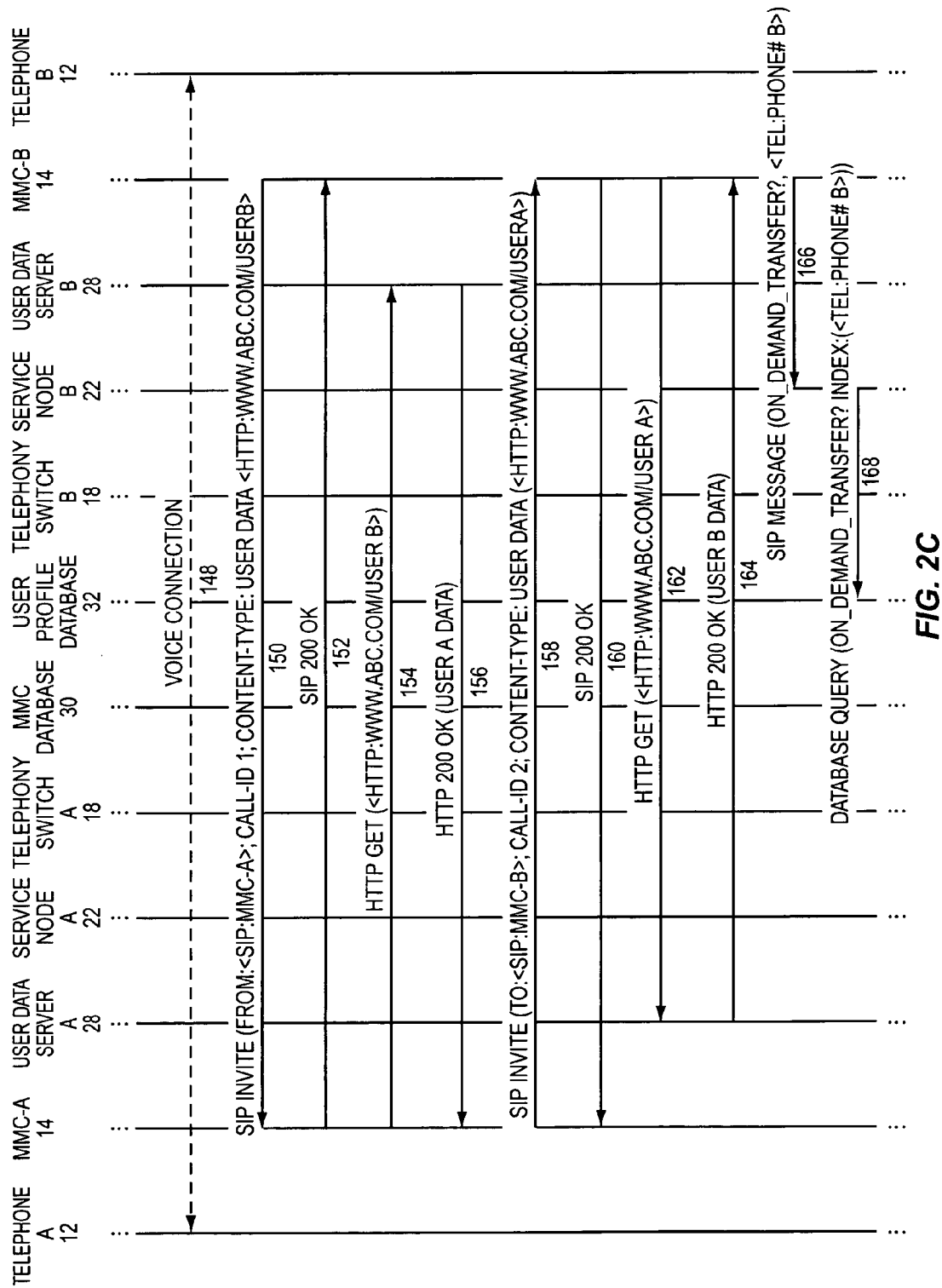
Figure 2D:
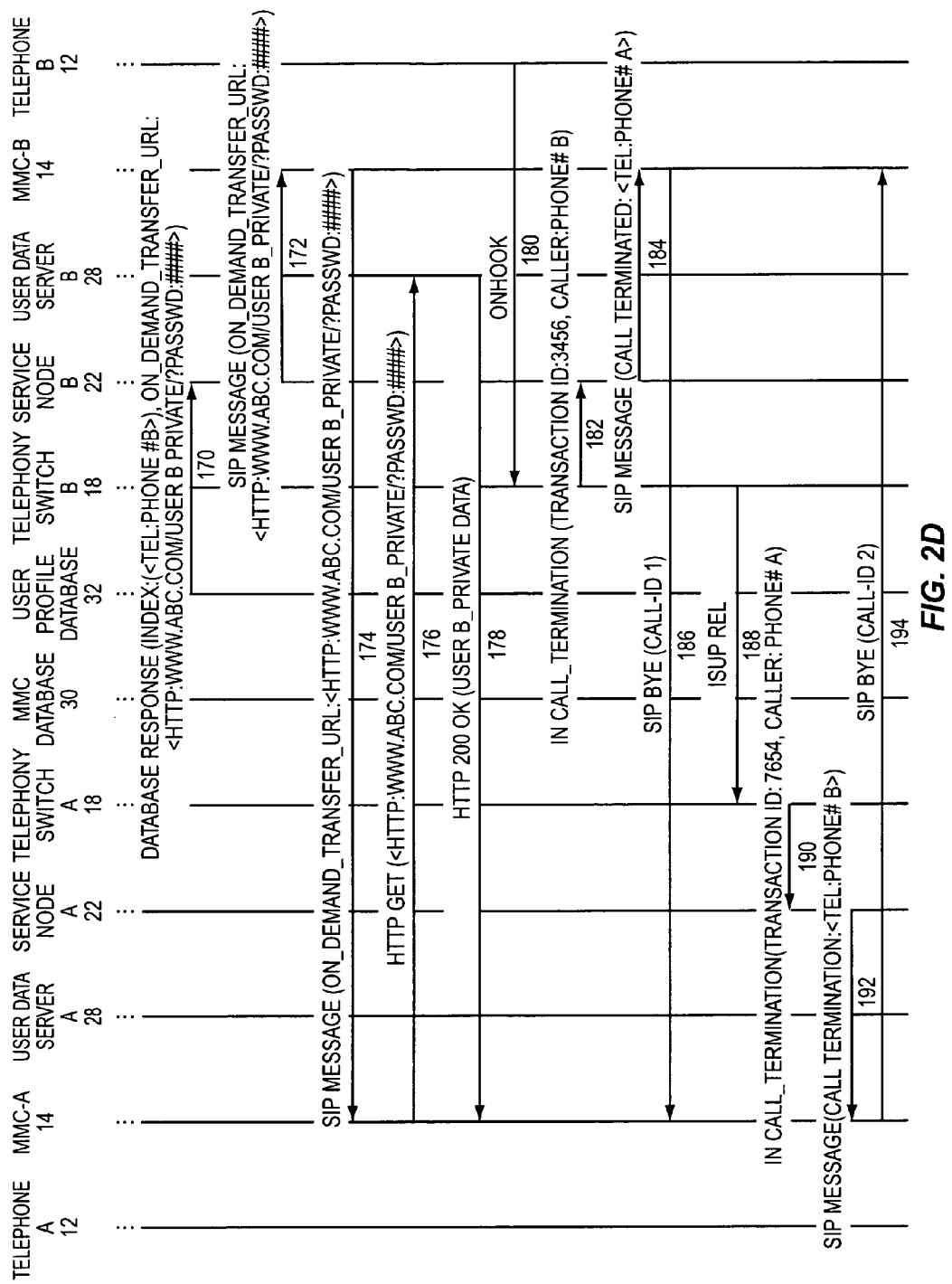

With particular reference to FIG. 1, a communication environment 10 is illustrated according to a first embodiment of the present invention. A telephony device 12 capable of establishing a voice-based telephone call is associated with a multimedia client (MMC) 14, which can be any type of device, such as a computer capable of interacting with other multimedia clients 14 and network devices. In general, the association of a telephony device 12 and a multimedia client 14 is referred to as a combined client 16. For the purposes of conciseness and clarity, the telephony device 12 will be referred to as a telephone 12, but should not be limited to a traditional telephone. Further, communications for either the telephone 12 or multimedia client 14 may be facilitated via packet, circuit-switched, or wireless means, as those skilled in the art will recognize.

In general, the telephones 12 will provide voice calls with other telephones 12 or other voice-capable devices via supporting telephony switches 18, which provide an interface to a voice network 20, such as the public switched telephone network (PSTN). In the illustrated example, it is assumed that the telephony switch 18 is a circuit-switched telephony switch, and the voice network 20 is the PSTN.

The association between the telephone 12 and the multimedia client 14 is provided by a service node 22, which interacts with the telephony switch 18, preferably using existing telephony protocols, such as those used for intelligent networks (IN), and with the multimedia client 14 via a data access network 24, preferably using the Session Initiation Protocol (SIP). The service node 22 may also communicate with other service nodes 22 and devices via a data network 26, as well as act as a SIP proxy for facilitating communications between multimedia clients 14.

For the present invention, the service node 22 will preferably receive triggers or event messages from a telephony switch 18 associated with a called party, and access a multimedia client database 30 to obtain an address for a multimedia client 14 associated with the caller and provide that address to the multimedia client 14 associated with the called party. The service node 22 for the called party may also access a user profile database 32, which stores a user profile defining information to disseminate and to whom the information should be disseminated. The user profile database 32 will preferably store an address for accessing information associated with the called party, as well as identify callers or types of callers to whom to send the address. Typically, the user profile database 32 is used for more private information transfers, and is often associated with on-demand delivery wherein one of the parties determines if and when to send the address for their private information to the multimedia client 14 of the other party. The multimedia client database 30 typically associates the address of a multimedia client 14 with a telephone number for a telephone 12 of a combined client 16.

With reference to FIGS. 2A–2D, an exemplary call flow is provided wherein user A initiates a telephone call from telephone A to telephone B. In this example, B has defined information to automatically disseminate to a defined list of callers, which includes user A, as well as on-demand information, which requires user B to authorize its dissemination.

Prior to initiating a call, certain provisioning will take place. For example, multimedia client B (14) may send provisioning information to the user profile database 32 (step 100), which includes addresses, and in particular uniform resource locators (URLs) for associated information stored on user data server B (28) for the automatic information and the on-demand information. In this example, the on-demand information is associated with a password provided by user B. Multimedia client B (14) will also send provisioning information defining criteria for the profile to identify a list of callers by their telephone numbers to whom automatic and on-demand information should be sent (step 102). Next, multimedia client B (14) can provision web content at the associated addresses for the automatic and on-demand information at user data server B (28) (step 104). Similarly, user A may provide provisioning information to the user profile database 32 to establish the addresses (URLs) for automatic and on-demand information and automatic and on-demand criteria for providing these addresses to callers (steps 106 and 108). User data server A (28) can be provisioned by multimedia client A (14) to provide web content associated with user A's automatic and on-demand addresses (step 110).

Next, multimedia client A (14) should register with the system by associating its address with the telephone numbers corresponding to associated telephone A (12). Registration for multimedia client A (14) can be effected by sending a SIP REGISTER message providing multimedia client A's address and the telephone number for telephone A (12) to service node A (22) (step 112), which will send a similar SIP REGISTER message to the multimedia client database 30 (step 114), where the association is stored. Multimedia client B (14) will likewise send a SIP REGISTER message including multimedia client B's address and the telephone number for telephone B (12) to service node B (22) (step 116), which will send a similar SIP REGISTER message to the multimedia client database 30 to provide the association of multimedia client B (14) and telephone B (12) (step 118).

When user A initiates a call, telephone A (12) will send dual tone multi-frequency (DTMF) digits corresponding to the telephone number for telephone B (12) to telephony switch A (18) (step 120), which has been provisioned to send an intelligent network (IN) origination attempt trigger to service node A (22) (step 122). The origination attempt trigger is a message that preferably includes a transaction ID, along with the telephone numbers for telephone A (12) and telephone B (12). Service node A (22) will respond with a CONTINUE message (step 124), which will trigger telephony switch A (18) to forward an Integrated Services User Protocol (ISUP) initial address message (IAM) to telephony switch B (18) (step 126). The ISUP IAM message will include the telephone numbers for telephone A (12) and telephone B (12).

In response, telephony switch B (18) will send a termination attempt trigger with a transaction ID and the telephone numbers for telephone A (12) and telephone B (12) to service node B (22) (step 128). Upon receiving a CONTINUE message from service node B (22) (step 130), telephony switch B (18) will send a RINGING message to telephone B (12) (step 132), which will trigger telephone B (12) to begin ringing. In the meantime, telephony switch B (18) will send an ISUP address complete message (ACM) to telephony switch A (18) (step 134).

At this point, service node B (22) will query the multimedia client database 30 by sending a SIP INVITE message including the telephone number for telephone A (12), along with a transaction number allowing the service node B (22) to support requests from several calls in parallel (step 136), which will identify the address for multimedia client A (14) and respond to the SIP INVITE message by sending a SIP 300 message providing the same call identifier along with the telephone number for telephone A (12) and the address for multimedia client A (14) to service node B (22) (step 138). Upon receiving the SIP 300 message, service node B (22) will send a SIP MESSAGE message to multimedia client B (14) indicating that telephone B (12) is receiving an incoming call and providing the address for multimedia client A (14) and the telephone number for telephone A (12) (step 140). Using the address for multimedia client A (14), multimedia client B (14) will forward the address for multimedia client B (14) and the telephone number for telephone B (12) to multimedia client A (14) (step 142). Assume that user B answers telephone B (12), which sends an OFFHOOK message to telephony switch B (18) (step 144), which will send an ISUP answer (ANS) message to telephony switch A (18) (step 146). At this point, a voice connection is established between telephone A (12) and telephone B (12) (step 148).

At this point, multimedia client B (14) has the address for multimedia client A (14), and will preferably have an address for the less private, automated information associated with user B, and as such, will automatically send a SIP INVITE message to multimedia client A (14) using multimedia client A's address (step 150). The SIP INVITE message will include an address at which multimedia client A (14) can access information associated with user B. The SIP INVITE message may also include call identification information. Multimedia client A (14) will send a SIP 200 OK message back to multimedia client B (14) in response to the SIP INVITE message (step 152). In response, multimedia client A (14) will preferably present a message to user A indicating that user B has sent an address at which information may be accessed (step not shown). Assuming that user A wants to access user B's information, multimedia client A (14) is instructed to send a request to user data server B (28) using the address for user B's information. Typically, the request is an HTTP (hypertext transfer protocol) GET message including the provided address (step 154). User data server B (28) will respond by providing the information to multimedia client A (14) (step 156). At this point, user A can view the more public, automated information provided by user B.

Assuming that user A has information to disseminate, multimedia client A (14) can be configured to automatically or on demand (by user A) send a SIP INVITE message to multimedia client B (14) with an address at which information can be accessed at user data server A (28) (step 158). Multimedia client B (14) will respond with a SIP 200 OK message (step 160). User B can instruct multimedia client B (14) to get the information through an HTTP GET request using the address for user A's information to user data server A (28) (step 162), which will deliver the address associated with user A's information to multimedia client B (14) (step 164).

Next, multimedia client B (14) may be configured to query user B as to whether on-demand information should be made available to user A. Assuming that user B wants to provide the on-demand information to user A, multimedia client B (14) will send a SIP MESSAGE message to service node B (22) providing the telephone number for associated telephone B (12) and an indication that the on-demand information is being requested for delivery to user B (step 166). Service node B (22) will send a database query to the user profile database 32 based on the telephone number for telephone B (12) (step 168). The user profile database 32 will use the telephone number for telephone B (12) to identify an address for the on-demand information associated with user B, along with the associated password, and send a response to service node B (22) (step 170). Upon receipt, service node B (22) will send a SIP MESSAGE message to multimedia client B (14) providing the address for the on-demand information and the associated password (step 172). Multimedia client B (14) will then send a SIP MESSAGE message to multimedia client A (14) to effectively deliver the address for the on-demand information and the associated password (step 174). Multimedia client A (14) will preferably alert user A of the availability of the information, and if so instructed, send an HTTP GET request to user data server B (28) to obtain the information at the address associated with the on-demand information (step 176). Preferably, the password is provided along with the request, such that the information can be accessed. User data server B (28) will respond by sending the more private, on-demand information of user B to multimedia client A (14) (step 178).

Assuming user B hangs up telephone B (12) to end the telephone call, telephone B (12) will send an ONHOOK message to telephony switch B (18) (step 180), which will send a call termination trigger to service node B (22) identifying the transaction and telephone B (12) by providing the telephone number for telephone B (12) (step 182). Service node B (22) will alert multimedia client B (14) of call termination by sending a SIP MESSAGE message to multimedia client B (14) along with the telephone number for telephone A (12) (step 184). As such, multimedia client B (14) will know to alert multimedia client A (14) of the call termination by sending a SIP BYE message, which identifies the call, to multimedia client A (14) (step 186).

Meanwhile, telephony switch B (18) will send an ISUP release (REL) message to telephony switch A (18) (step 188), which will send a call termination trigger to service node A (22) identifying the transaction and telephone A (12)

by providing the telephone number for telephone A (12) (step 190). Service node A (22) will respond by sending a SIP MESSAGE message indicating that the call with telephone B (12) was terminated (step 192). Multimedia client A (14) will then send a SIP BYE message identifying the call to multimedia client B (14) (step 194), and the process ends.

Figure 3:
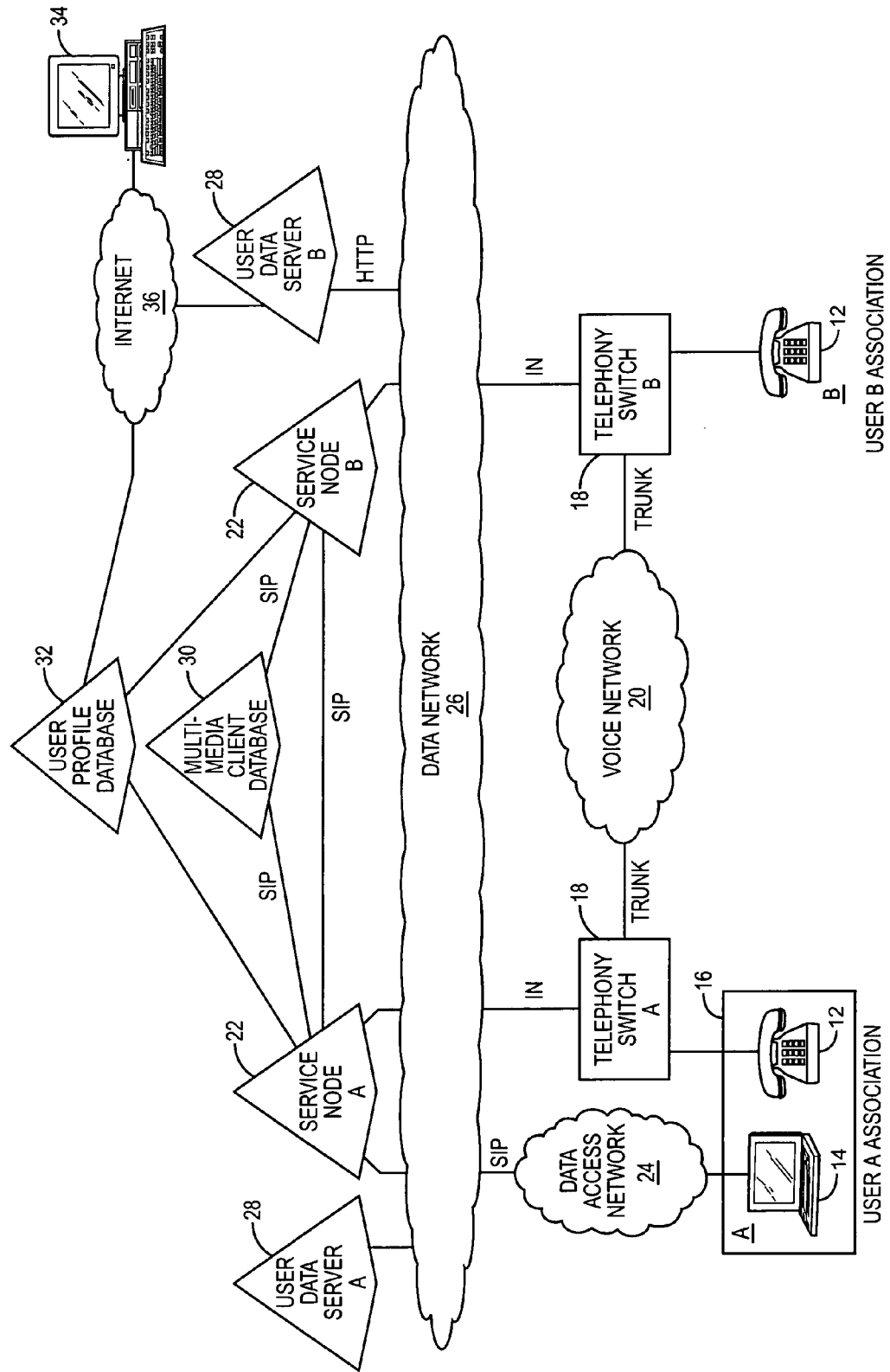
FIG. 3 is a block representation of a communication environment according to a second embodiment of the present invention.
Figure 4A:
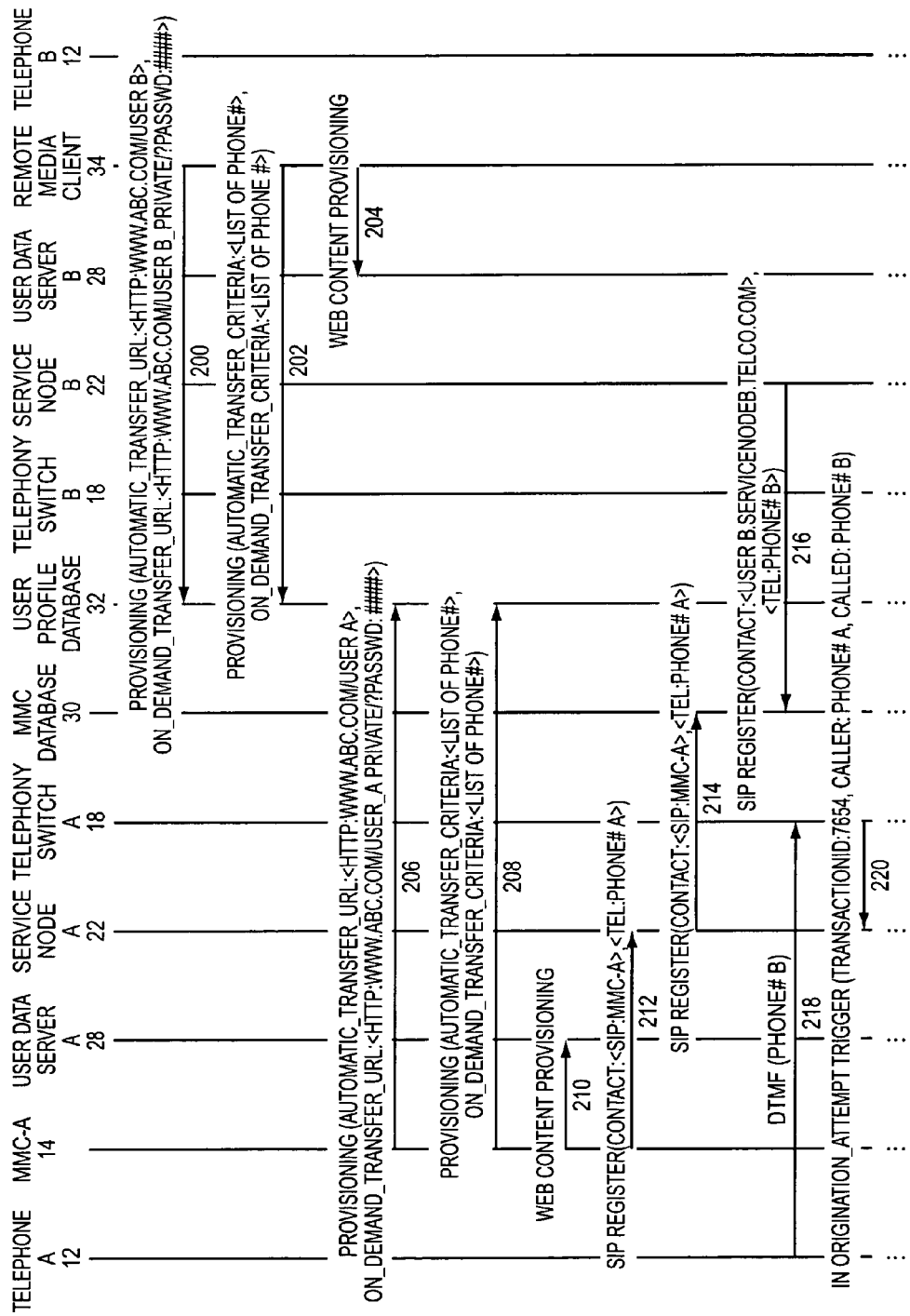
FIGS. 4A–4D are a call flow in association with the communication environment of FIG. 3.
Figure 4B:
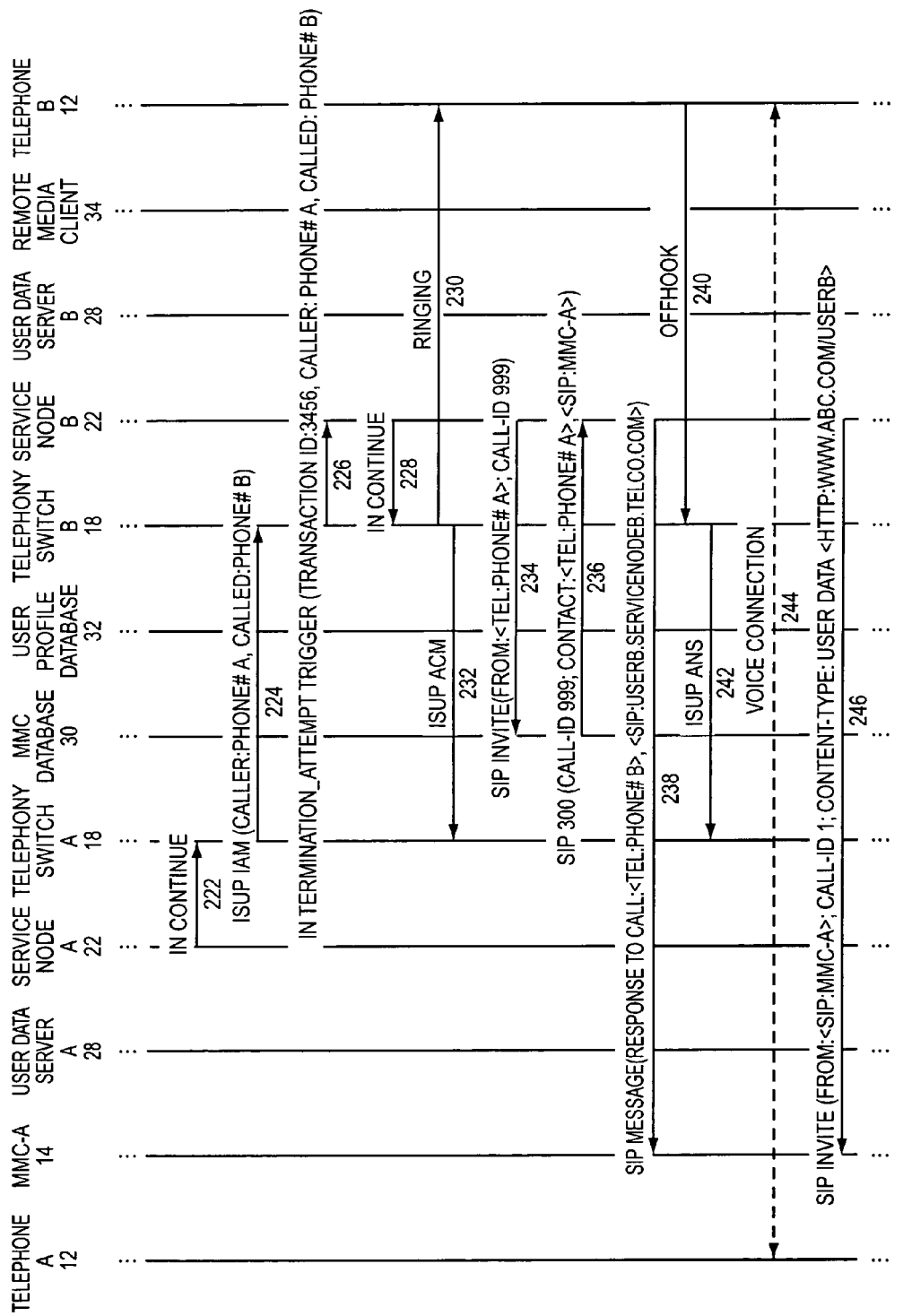
Figure 4C:
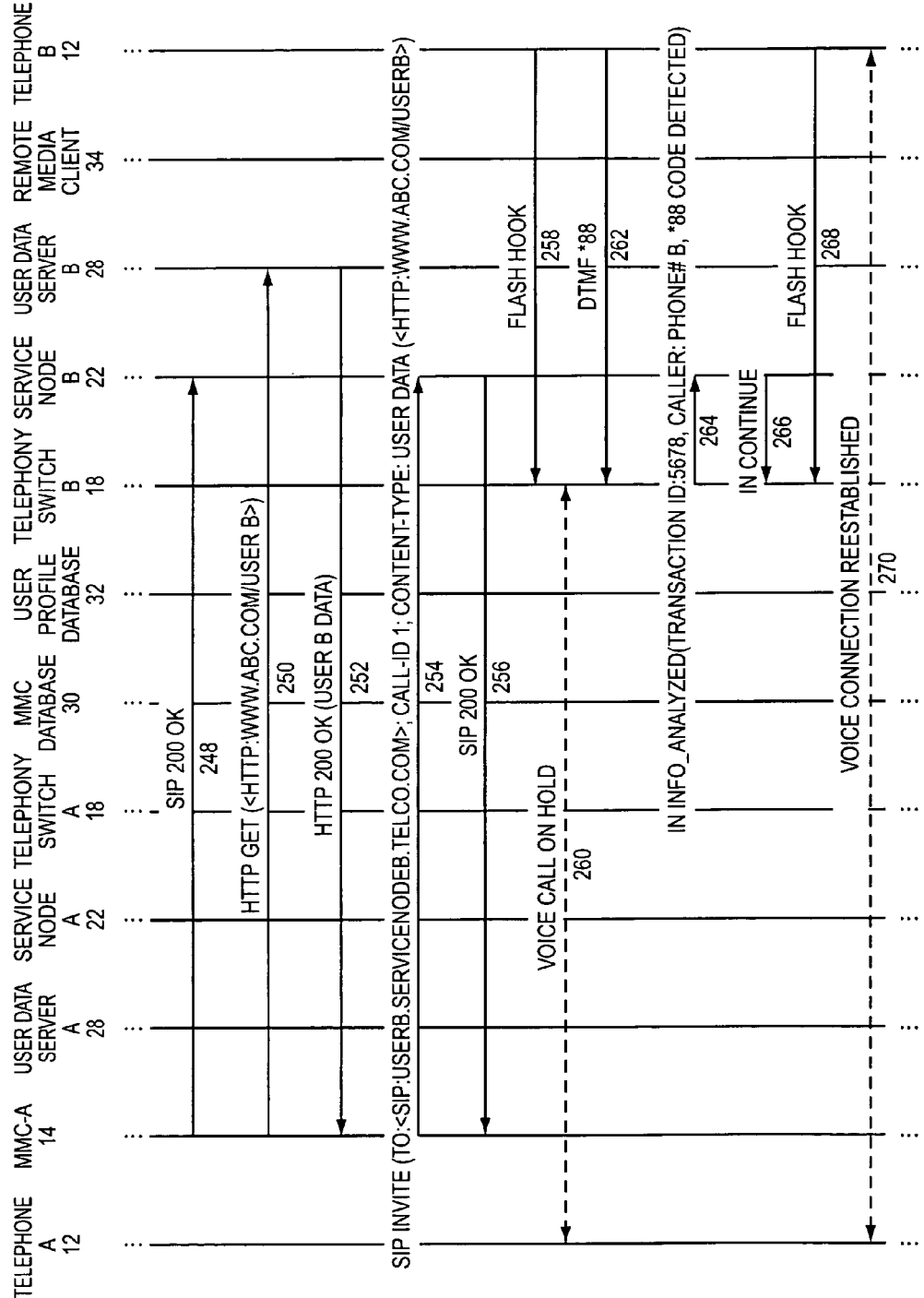
Figure 4D:
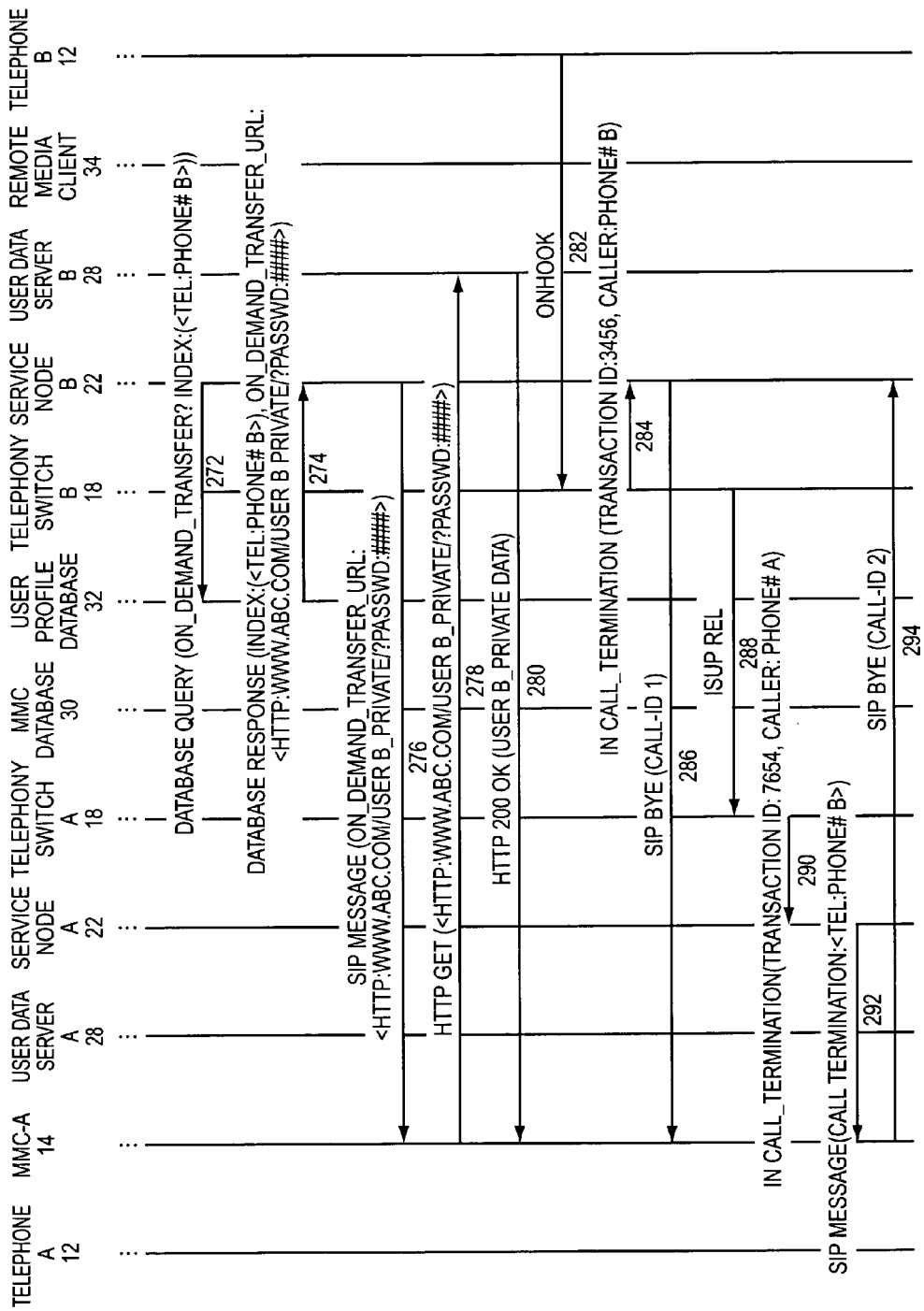

FIG. 3 represents another embodiment of the invention wherein user B is not associated with a multimedia client 14 or user B's multimedia client 14 is not logged on or registered. In those cases, service node B (22) assumes the role of a multimedia client 14 that would be associated with user B, and a remote media client 34 provides provisioning information to the user profile database 32 and addresses for the automated and on-demand information, as well as any criteria, such as a list of telephone numbers to which the addresses may be provided. The remote media client 34 may be a computer, which is accessible by user B on a periodic basis, or may be provided independently by a service provider, such as a telephone company service provider.

An exemplary call flow is illustrated in FIGS. 4A–4D, wherein the remote media client 34 provides the provisioning information to the user profile database 32, as well as to user data server B (28) in a fashion similar to that described above (steps 200–204). Also, multimedia client A (14) provides provisioning information to the user profile database 32 and web content to user data server A (28) as described above (steps 206–210). Multimedia client A (14) will send a SIP REGISTER message to service node A (22) to associate the address for multimedia client A (14) with the telephone number for telephone A (12) (step 212). Service node A (22) will send a SIP REGISTER message with the address for multimedia client A (14) and the telephone number for telephone A (12) to the multimedia client database 30 (step 214). Likewise, service node B (22) acting on behalf of user B will send a SIP REGISTER message providing its address, instead of a multimedia client address, in association with the telephone number for telephone B (12), such that service node B (22) is associated with telephone B (12) in the multimedia client database 30 (step 216).

When a call is initiated from telephone A (12) to telephone B (12), the DTMF digits for the telephone number of telephone B (12) are sent to telephony switch A (18) (step 218), which will send an origination attempt trigger to service node A (22) (step 220). Service node A (22) will send a CONTINUE message back to telephony switch A (18) (step 222), which will send an ISUP IAM message containing the telephone numbers for telephones A and B (12) to telephony switch B (18) (step 224), which will then forward a termination attempt trigger, including a transaction ID and the telephone numbers for telephones A and B (12) to service node B (22) (step 226). Service node B (22) will send a CONTINUE message back to telephony switch B (18) (step 228), which will initiate a RINGING message to telephone B (12) (step 230), which will begin ringing. Telephony switch B (18) will also send an ISUP ACM message to telephony switch A (18) indicating that telephone B (12) is being rung (step 232).

Service node B (22) will send a SIP INVITE message to the multimedia client database 30 to recover the address for multimedia client A (14) (step 234), which is returned back to service node B (22) in a SIP 300 message (step 236). Instead of sending the address for multimedia client A (14) to a multimedia client associated with telephone B (12), service node B (22) will send a SIP MESSAGE message directly to multimedia client A (14) (step 238). The SIP MESSAGE message includes the telephone number for telephone B (12) and an address for service node B (22), wherein the address is an address associated with user B. In the meantime, telephone B (12) will be answered and send an OFFHOOK message to telephony switch B (18) (step 240), which will forward an ISUP ANS message to telephony switch A (18) (step 242). At this point, a voice connection is established between telephones A and B (12) (step 244).

At this point, delivery of the address associated with the automated information of user B is initiated. Service node B (22) will send a SIP INVITE message to multimedia client A (14) using multimedia client A's address (step 246), and include an address at which the automated information for user B can be accessed. Multimedia client A (14) will respond with a SIP 200 OK message (step 248), and upon instruction from user A, will send an HTTP GET message to access the information stored at the address identified at user data server B (28) (step 250). User data server B (28) will respond with an HTTP 200 OK message with the automated information (step 252).

Multimedia client A (14) may initiate delivery of an address associated with the automated information of user A by sending a SIP INVITE message to service node B (22) (step 254). Notably, the SIP INVITE message is sent directly to service node B (22), and since user B is not associated with a multimedia client 14, service node B (22) will send a SIP 200 OK message indicating the SIP invite was received (step 256), but will not send a message requesting automated information for user A, as user B cannot use it or gain access to it.

For the on-demand information that requires user B's authorization to initiate delivery, the lack of a multimedia client 14 requires an alternative mechanism to trigger delivery of an offer to provide the on-demand information. In this embodiment, telephone B (12) simply provides a flash hook by toggling on hook and then off hook to send a flash hook message to telephony switch B (18) (step 258). Telephony switch B (18) will place the voice call on hold (step 260) and await DTMF digits corresponding to a service code. Assuming the service code is "*88," which indicates the need to offer on-demand information (step 262), telephony switch A (18) will send an information analyzed message to service node B (22) indicating the code was detected and identifying the telephone number for telephone B (12) (step 264). Service node B (22) will send a CONTINUE message to telephone switch B (18) (step 266) and await another flash hook message from telephone B (12). When telephony switch B (18) receives the second flash hook message from telephone B (12) (step 268), the voice connection between telephones A and B (12) is reestablished (step 270). Meanwhile, service node B (22) will send a database query to the user profile database 32 (step 272) including the telephone number for telephone B (12) to obtain the address for the on-demand information associated with user B. The user profile database 32 will use the telephone number for telephone B (12) to look up the address for the on-demand information for user B, which is also associated with a password, and send the address and password to service node B (22) (step 274).

Again, since there is no multimedia client associated with user B in this example, service node B (22) will send a SIP MESSAGE message including the address for the on-demand information and the password associated therewith directly to multimedia client A (14) (step 276). In response, multimedia client A (14) will send a SIP 200 OK message back to service node B (22) (step not shown). Multimedia client A (14) will alert user A that the on-demand information is available, and if directed by user A multimedia client A (14) will send an HTTP GET message including the address and password associated with the on-demand information to user data server B (28) (step 278), which will respond with an HTTP 200 OK message including the on-demand information (step 280).

Once user B hangs up telephone B (12), an ONHOOK message is sent to telephony switch B (18) (step 282), which will send a call termination message identifying the telephone number for telephone B (12) to service node B (22) to indicate that the call is being terminated (step 284). Service node B (22) will respond by sending a SIP BYE message including the call identification to multimedia client A (14) (step 286), and telephony switch B (18) will send an ISUP release (REL) message to telephony switch A (18) (step 288). Telephony switch A (18) will send a call termination message including the telephone number for telephone A (12) and the transaction identification to service node A (22) (step 290), which will send a SIP MESSAGE message indicating that the call with telephone B (12) is terminated to multimedia client A (14) (step 292). Multimedia client A (14) may also respond with a SIP BYE message to service node B (22) to indicate that the session and call are terminated (step 294).

Figure 5:
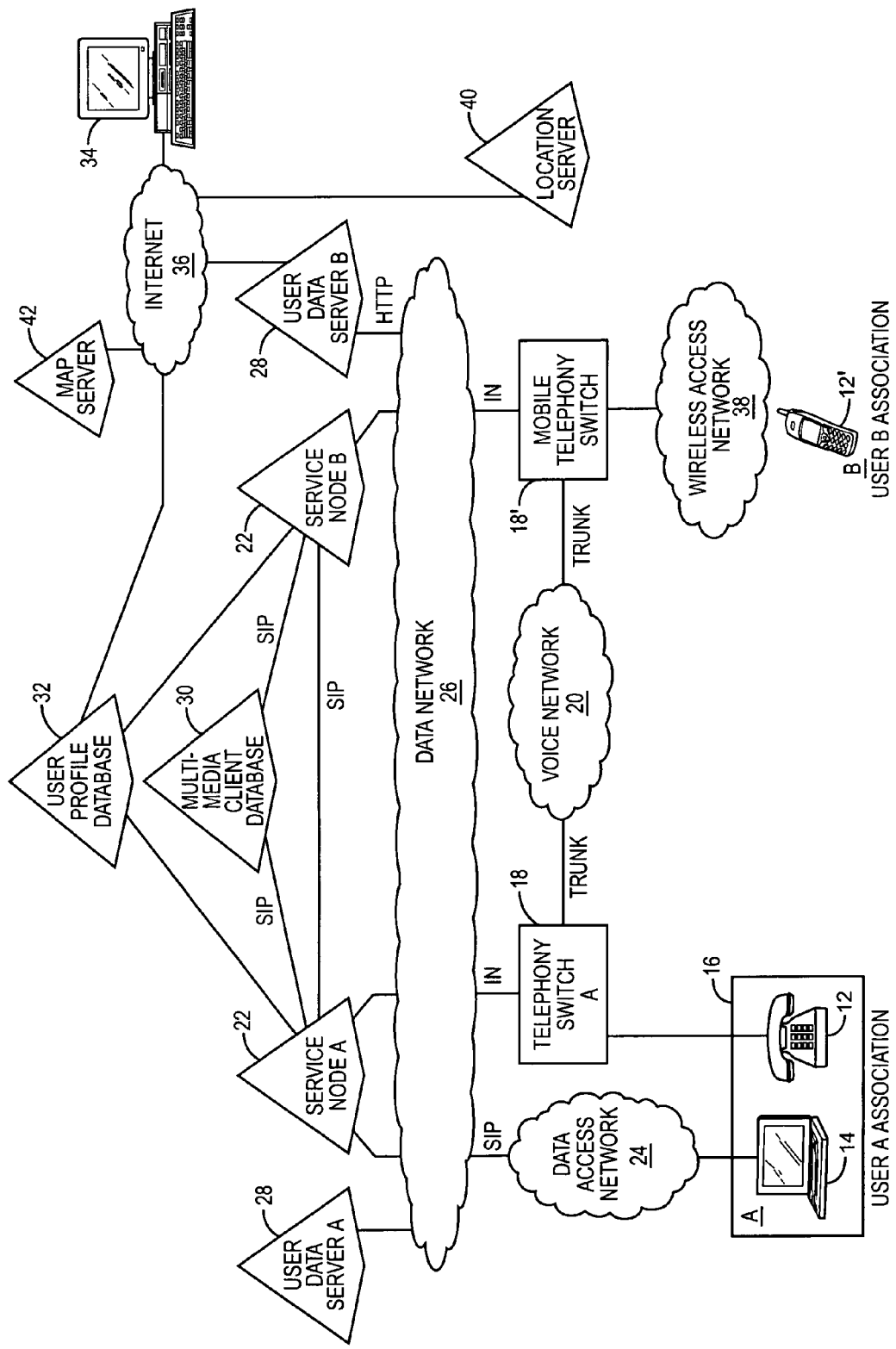
FIG. 5 is a block representation of a communication environment according to a third embodiment of the present invention.
Figure 6A:
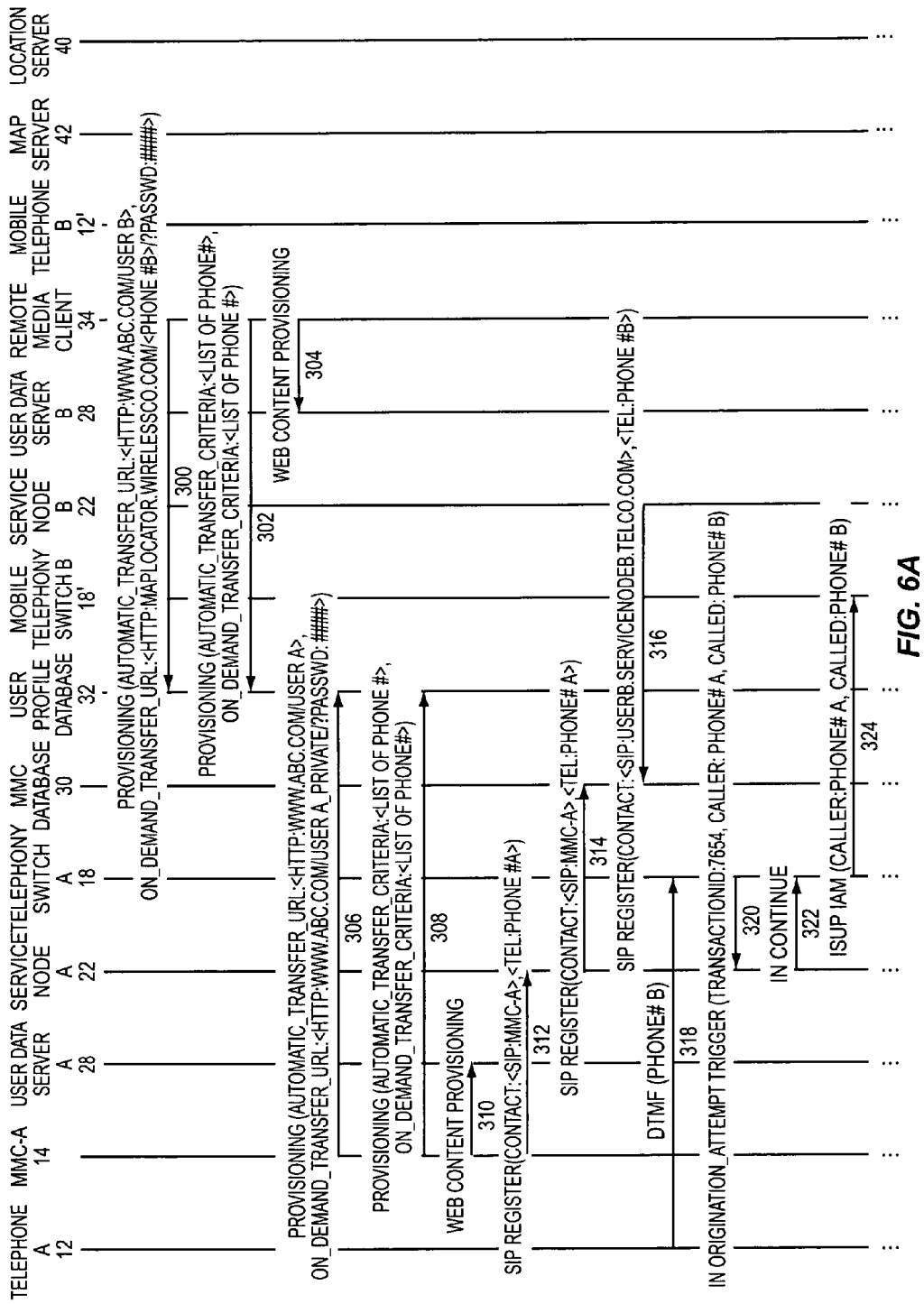
FIGS. 6A–6D are a call flow in association with the communication environment of FIG. 5.
Figure 6B:
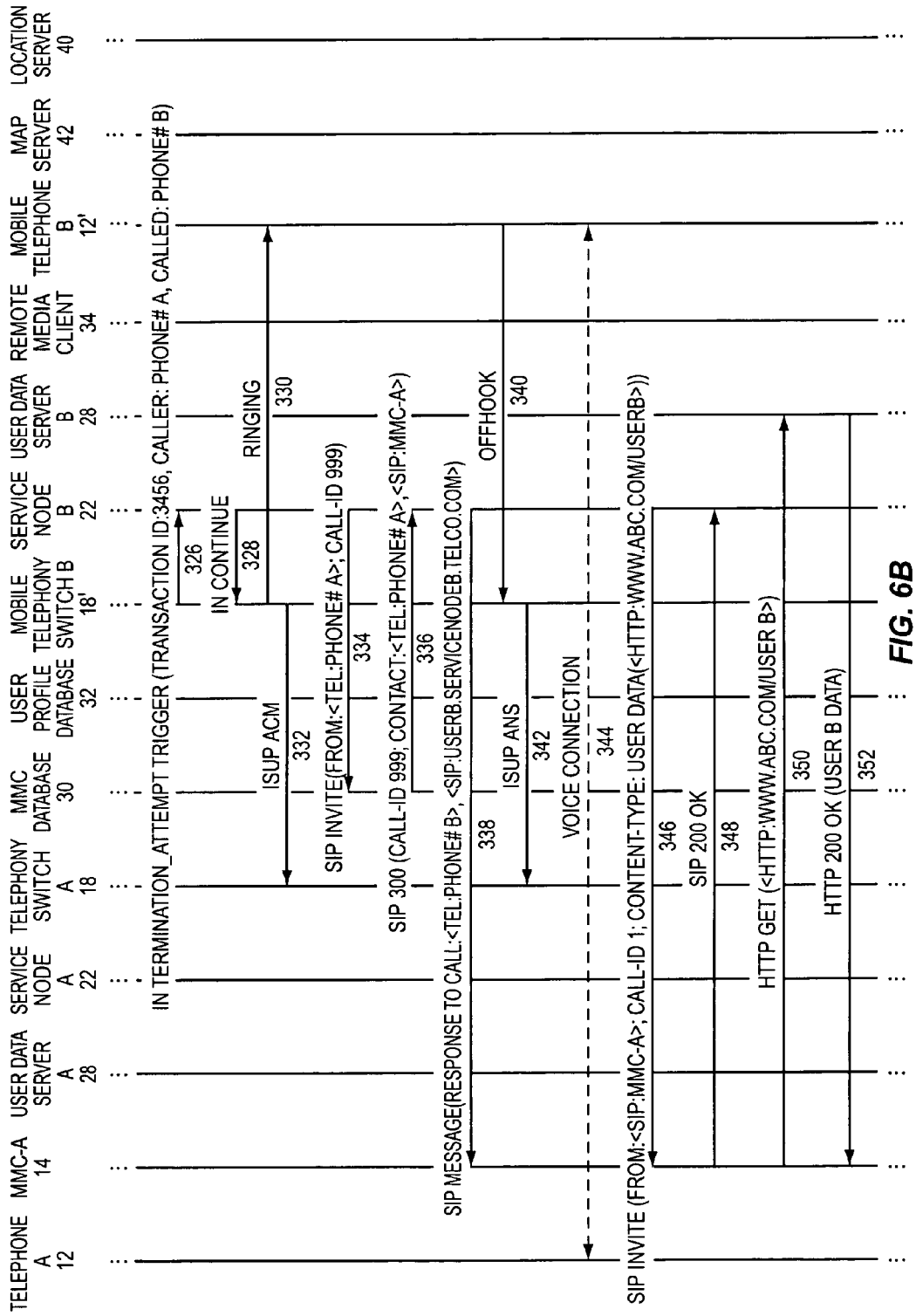
Figure 6C:
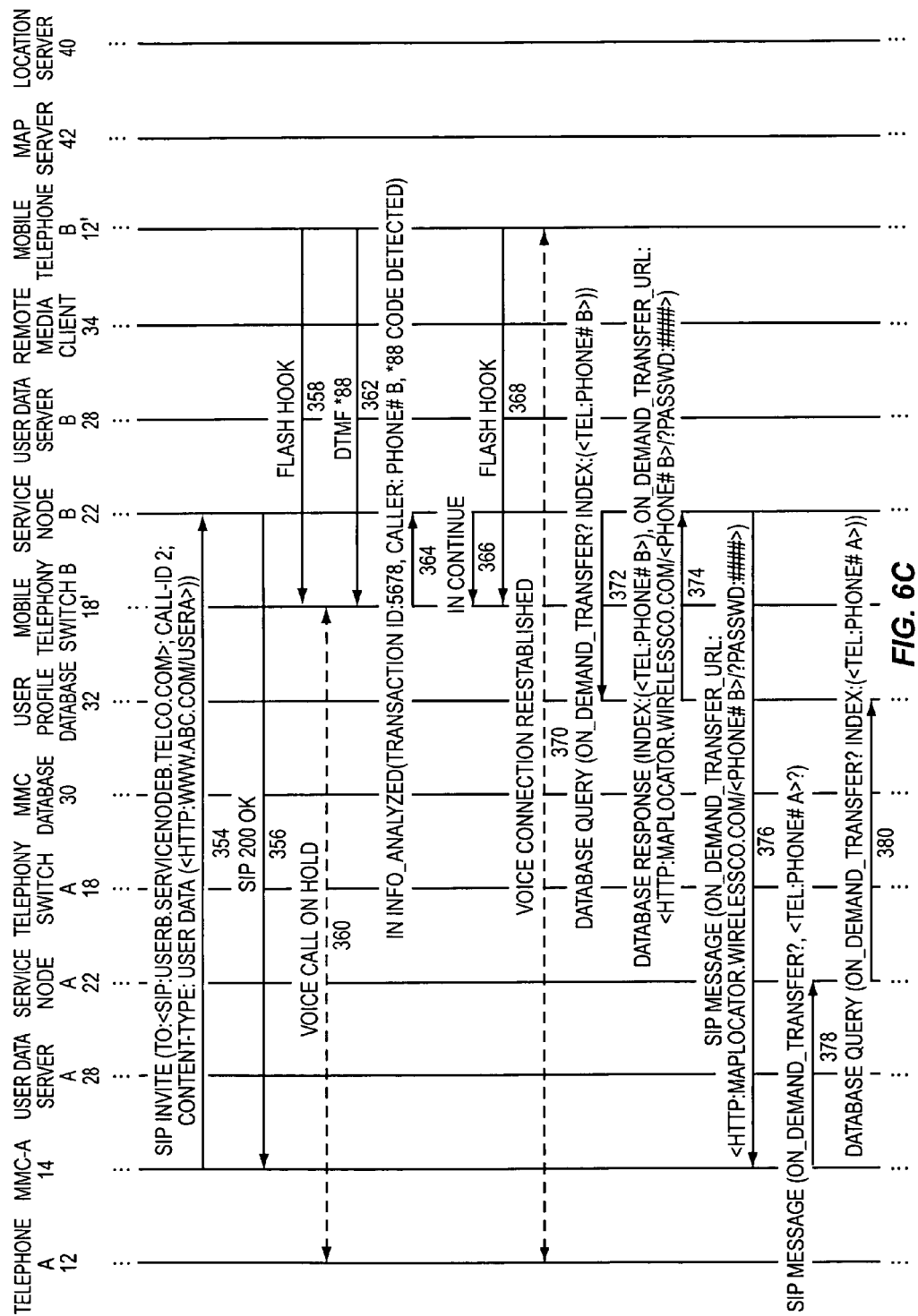
Figure 6D:
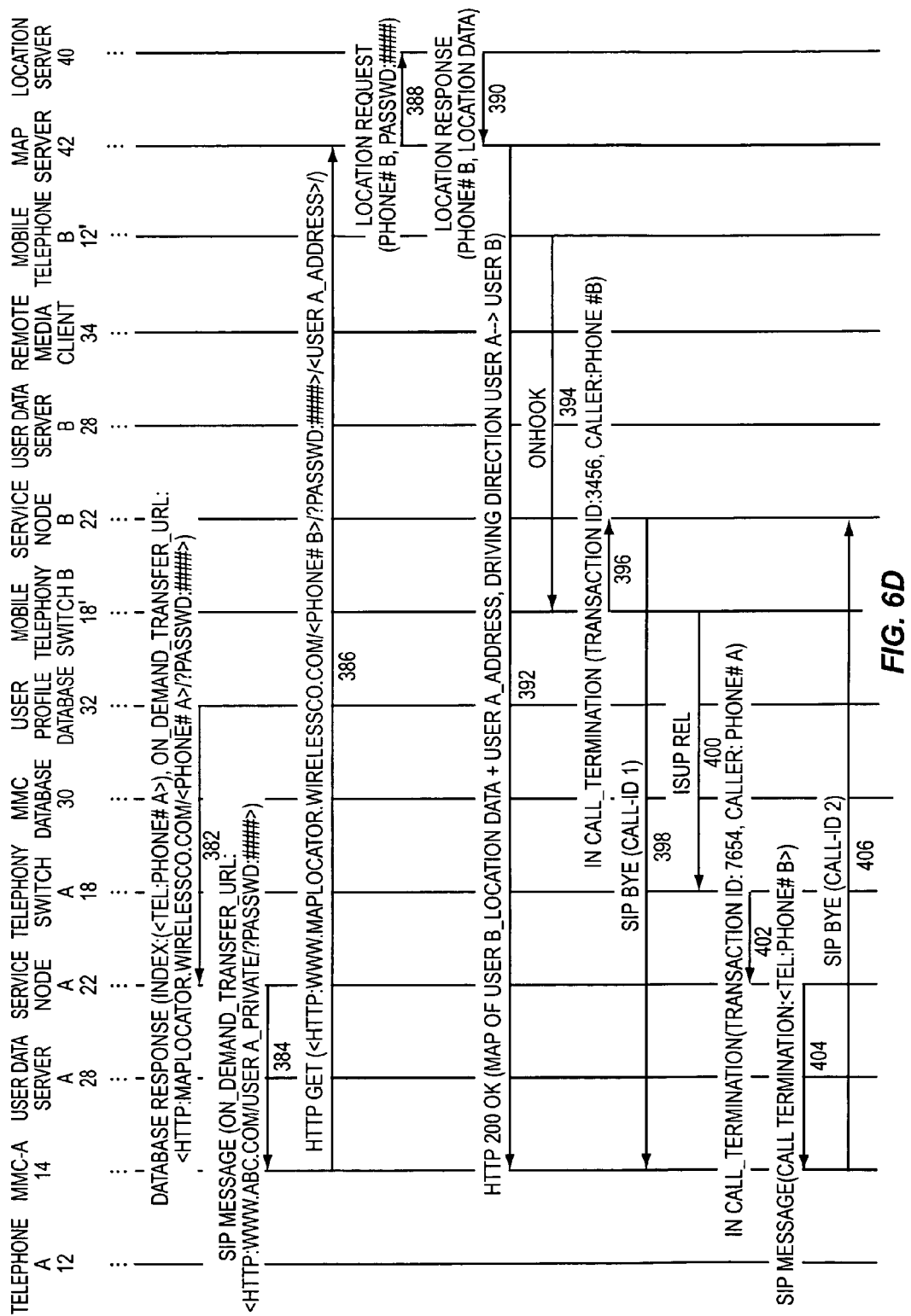

In yet another exemplary embodiment as illustrated in FIG. 5, user B is associated with a mobile telephone 12' supported by a wireless access network 38, which is typically comprised of multiple cells defined by base stations operated by a mobile telephony switch 18'. In a typical mobile environment, mobile telephone 12' will usually not be in close proximity to another device capable of being a multimedia client. As such, a wireless environment is similar to that depicted in FIG. 3, and as such, delivery of an address for automated or on-demand information can be facilitated as described above. Further, the information ultimately provided in an automated or on-demand fashion may vary greatly, and one particularly interesting type of information relates to the location of the called party.

In the following example, user B will provide automated information of some type, and provide on-demand information bearing on the location of mobile terminal 12', which is referred to hereafter as mobile telephone B for clarity. Those skilled in the art will recognize various mechanisms for identifying the location of a mobile telephone B (12'), including triangulation, servicing cell location, and GPS signal analysis. For this example, it is assumed that the location information for mobile telephone B (12') is stored in a location server 40, which may receive information from mobile telephony switch B (18') as well as provide information to user data server B (28) via the Internet 36. In addition to simply providing location information for mobile telephone B (12'), location information may be obtained for user A, such that the location information for user A and user B can be depicted on a map. With this information, driving directions may be obtained from a map server 42 and made available at the address for the on-demand information for user B. An exemplary call flow is provided below in association with FIGS. 6A–6D, wherein basic automated information for user B is provided to user A upon establishing a call, and subsequent on-demand information is provided to user A via multimedia client A (14). The on-demand information bears on location, and in particular, includes driving directions from user A's location to user B's current location. In this example, the address for the on-demand information points to map server 42. The map server 42 will access the location server 40 to get the latest address for mobile telephone B (12') and use mobile terminal B's current location to respond to multimedia client A (14). If location information for user A is provided along with the request for location information for user B or is otherwise made available, a map showing the locations of both user A and user B can be generated along with driving directions from user A to user B's location.

Initially, the remote media client 34 provides the provisioning information to the user profile database 32, as well as user data server B (28) (steps 300–304) in a fashion similar to that described above. Also, multimedia client A (14) provides provisioning information to the user profile database 32 and web content to user data server A (28) as described above (steps 306–310). Multimedia client A (14) will send a SIP REGISTER message to service node A (22) to associate the address for multimedia client A (14) with the telephone number for telephone A (12) (step 312). Service node A (22) will send a SIP REGISTER message with the address for multimedia client A (14) and the telephone number for telephone A (12) to the multimedia client database 30 (step 314). Likewise, service node B (22) acting on behalf of user B will send a SIP REGISTER message providing its address, instead of a multimedia client address, in association with the telephone number for mobile telephone B (12'), such that service node B (22) is associated with mobile telephone B (12') in the multimedia client database 30 (step 316).

When a call is initiated from telephone A (12) to mobile telephone B (12'), the DTMF digits for the telephone number of mobile telephone B (12') are sent to telephony switch A (18) (step 318), which will send an origination attempt trigger to service node A (22) (step 320). Service node A (22) will send a CONTINUE message back to telephony switch A (18) (step 322), which will send an ISUP IAM message containing the telephone numbers for telephone A (12) and mobile telephone B (12') to mobile telephony switch B (18') (step 324), which will then forward a termination attempt trigger, including a transaction ID and the telephone numbers for telephone A (12) and mobile telephone B (12') to service node B (22) (step 326). Service node B (22) will send a CONTINUE message back to mobile telephony switch B (18') (step 328), which will initiate a RINGING message to mobile telephone B (12') (step 330), which will begin ringing. Mobile telephony switch B (18') will also send an ISUP ACM message to telephony switch A (18) indicating that mobile telephone B (12') is being rung (step 332).

Service node B (22) will send a SIP INVITE message to the multimedia client database 30 to recover the address for multimedia client A (14) (step 334), which is returned back to service node B (22) in a SIP 300 message (step 336). Instead of sending the address for multimedia client A (14) to a multimedia client associated with mobile telephone B (12'), service node B (22) will send a SIP MESSAGE message directly to multimedia client A (14) (step 338). The SIP MESSAGE message includes the telephone number for mobile telephone B (12') and an address for service node B (22), wherein the address is an address associated with user B. In the meantime, mobile telephone B (12') will be answered and send an OFFHOOK message to mobile telephony switch B (18') (step 340), which will forward an ISUP ANS message to telephony switch A (18) (step 342). At this point, a voice connection is established between telephone A (12) and mobile telephone B (12') (step 344).

Next, delivery of the address associated with the automated information of user B is initiated. Service node B (22) will send a SIP INVITE message to multimedia client A (14) using multimedia client A's address (step 346), and include an address at which the automated information for user B can be accessed. Multimedia client A (14) will respond with a SIP 200 OK message (step 348), and upon instruction from user A, will send an HTTP GET message to access the information stored at the address identified at user data server B (28) (step 350). User data server B (28) will respond with an HTTP 200 OK message with the automated information (step 352).

Multimedia client A (14) may initiate delivery of an address associated with the automated information of user A by sending a SIP INVITE message to service node B (22) (step 354). Notably, the SIP INVITE message is sent directly to service node B (22), and since user B is not associated with a multimedia client 14, service node B (22) will send a SIP 200 OK message indicating the SIP invite was received (step 356), but will not send a message requesting automated information for user A, as user B cannot use it or gain access to it.

For the on-demand information that requires user B's authorization to initiate delivery, the lack of a multimedia client 14 requires an alternative mechanism to trigger delivery of an offer to provide the on-demand information. In this embodiment, mobile telephone B (12') simply provides a flash hook by toggling on hook and then off hook to send a flash hook message to mobile telephony switch B (18') (step 358). Mobile telephony switch B (18') will place the voice call on hold (step 360) and await DTMF digits corresponding to a service code. Assuming the service code is "*88," which indicates the need to offer on-demand information (step 362), mobile telephony switch B (18') will send an information analyzed message (364) to service node B (22) indicating the code was detected and identifying the telephone number for telephone B (12). Service node B (22) will send a CONTINUE message to mobile telephony switch B (18') (step 366) and await another flash hook message from mobile telephone B (12'). When mobile telephony switch B (18') receives the second flash hook message from mobile telephone B (12') (step 368), the voice connection between telephone A (12) and mobile telephone B (12') is reestablished (step 370).

Service node B (22) will send a query to the user profile database 32 (step 372), which will use the telephone number for mobile telephone B (12') provided in the query to find the address for the on-demand information associated with user B. In this case, the on-demand information is associated with a password and address to the map server 42. The address for the map server 42 is provided back to service node B (22) (step 374), which will forward the address and password to multimedia client A (14) along with the telephone number for mobile telephone B (12') (step 376).

Preferably, multimedia client A (14) will recognize that the on-demand information relates to location or mapping information, and will send a SIP MESSAGE message including the telephone number for telephone A (12) to service node A (22) (step 378), which will query the user profile database 32 (step 380) to obtain on-demand information for user A, based on the telephone number for telephone A (12) (step 380). The user profile database 32 will respond with an address for on-demand information for user A and an associated password. In this embodiment, the on-demand user information for user A relates to location information and in particular mapping information, as such, the address is an address to map server 42. The addressing and password information for user A's on-demand information is sent to service node A (22) (step 382), which forwards the information on to multimedia client A (14) (step 384) in a SIP MESSAGE message.

Once the address for the on-demand location information for user A is received at multimedia client A (14), multimedia client A (14) can access user data server A (28) or its internal data to obtain its address. Once the location information for multimedia client A (14) is determined, multimedia client A (14) can initiate a GET request to the map server 42 at the address provided for the on-demand information for user B, along with user B's password and user A's address (step 386). Assuming the HTTP GET request is a request for a map and driving directions, the map server 42 will access the location server 40 using the telephone number for mobile telephone B (12') and the password to identify the location of mobile telephone B (12') (step 388). The location server 40 will provide a response including the location data for mobile telephone B (12') to the map server 42 (step 390), which will generate a map and driving directions from the location of user A to the location of user B. This information is sent in an HTTP 200 OK message to multimedia client A (14) from the map server 42 (step 392).

When user B ends the voice session by hanging up mobile telephone B (12'), and ONHOOK message is send from mobile telephone B (12') to mobile telephony switch B (18') (step 394), which will send a call termination message to service node B (22) (step 396), which in turn will send a SIP BYE message to multimedia client A (14) (step 398). Mobile telephony switch B (18') will send an ISUP release message to telephony switch A (18) (step 400), which will send a call termination message to service node A (22) (step 402). Service node A (22) will send a SIP MESSAGE message to multimedia client A (14) indicating that the call with mobile telephone B (12') has been terminated (step 404), and multimedia client A (14) will send a SIP BYE message back to service node B (22) to complete the process (step 406).

Figure 7:
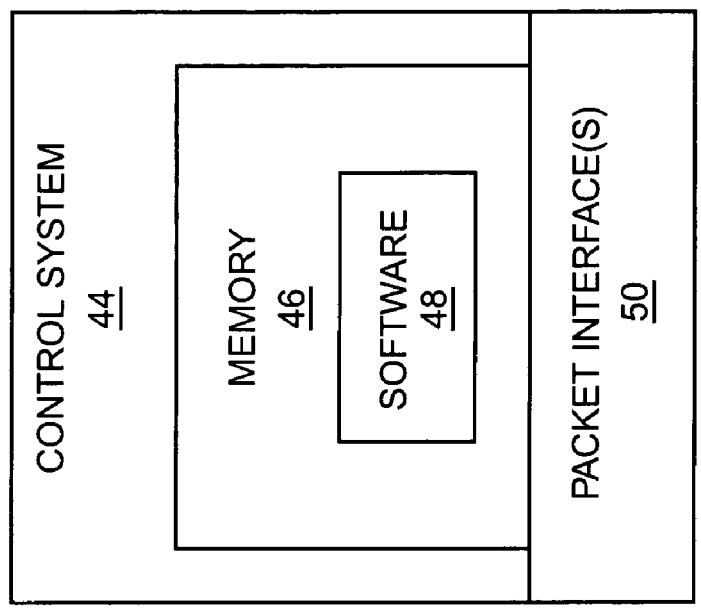
FIG. 7 is a block representation of a service node according to one embodiment of the present invention.

The service node 22 may be a stand-alone device or implemented as a function within any number of devices, including the telephony switch 18 or mobile telephony switch 18'. When in a stand-alone configuration as illustrated in FIG. 7, the service node 22 will typically include a control system 44 having sufficient memory 46 for software 48, which is capable of implementing the concepts described above. Further, a packet interface or interfaces 50 may be provided to interact with telephony switch 18, multimedia client database 30, user profile database 32, and other devices in the communication environment 10 to facilitate the interworking of an associated telephone 12 and multimedia client 14. For additional information relating to the interworking of multimedia clients and telephones, attention is directed to commonly assigned U.S. patent application Ser. No. 09/960,554 filed Sep. 21, 2001, Ser. No. 10/028,510 filed Dec. 20, 2001, Ser. No. 10/193,885 filed Jul. 12, 2002, Ser. No. 10/261,577 filed Oct. 1, 2002, Ser. No. 10/262,288 filed Oct. 1, 2002, and Ser. No. 10/262,022 filed Oct. 1, 2002, which are incorporated herein by reference in their entireties.

Those skilled in the art will recognize improvements and modifications to the preferred embodiments of the present invention. All such improvements and modifications are considered within the scope of the concepts disclosed herein and the claims that follow.

What is claimed is:

1. A method comprising:
registering a combined client with a multimedia client database;
receiving a message indicating a voice call is being initiated by a caller from a first telephony device associated with a first number to a called party at a second telephony device associated with a second number, wherein the first telephony device is part of the combined client;

determining a first address for a first multimedia client associated with the first telephony device based on the first number by querying the multimedia client database;

determining an information address from which information can be accessed;

effecting delivery of the information address to the first multimedia client using the first address, such that the information can be accessed by the first multimedia client using the information address; and sending the first address to a second multimedia client associated with the second telephony device and wherein delivery of the information address is effected by sending the information address to the second multimedia client, which can forward the information address to the first multimedia client using the first address; and receiving indication that the called party wants to authorize and effect delivery of the information address to the caller prior to effecting delivery of the information address, wherein the indication that the called party wants to authorize and effect delivery of the information address is received via the second multimedia client.

2. The method of claim 1 wherein delivery of the information address is effected by sending the information address to the first multimedia client using the first address.

3. The method of claim 1 wherein the indication that the called party wants to effect delivery of the information address is received via a telephony switch servicing the second telephony device.

4. The method of claim 3 wherein the indication that the called party wants to effect delivery of the information address is a feature code or verbal commands provided by the called party via the second telephony device.

5. The method of claim 1 further comprising:
automatically determining an automated information address from which automated information can be accessed; and
automatically effecting delivery of the automated information address to the first multimedia client using the first address, such that the automated information can be accessed by the first multimedia client using the automated information address.

6. The method of claim 1 wherein the information address is associated with the second number in a second database and further comprising accessing the second database using the second number to determine the information address.

7. The method of claim 1 wherein the first address is associated with the first number in the multimedia client database and wherein querying the multimedia client database comprises accessing the multimedia client database using the first number to determine the first address.

8. The method of claim 1 wherein the message is received via a telephony switch servicing the second telephony device.

9. The method of claim 1 wherein the information is related to the called party.

10. The method of claim 1 wherein the information includes a location of the called party.

11. The method of claim 1 wherein the information includes a location of the caller.

12. The method of claim 1 wherein the information includes directions to a location associated with the called party.

13. The method of claim 1 further comprising:
determining a second information address from which second information can be accessed; and
effecting delivery of the second information address to a second multimedia client associated with the second telephony device using a second address, such that the second information can be accessed by the second multimedia client using the second information address.

14. The method of claim 13 wherein the information is associated with the called party and the second information is associated with the caller.

15. The method of claim 14 wherein the second information address is delivered to the first multimedia client with the information.

16. The method of claim 14 further comprising receiving indication that the caller wants to authorize and effect delivery of the second information address to the called party prior to effecting delivery of the second information address.

17. The method of claim 1, wherein the information is provided in a form selected from at least one of the group consisting of a web page, media file, document file, graphics, streaming media, and pictures.

18. A system comprising a service node adapted to:
register a combined client with a multimedia client database;
receive a message indicating a voice call is being initiated by a caller from a first telephony device associated with a first number to a called party at a second telephony device associated with a second number, wherein the first telephony device is part of the combined client;
determine a first address for a first multimedia client associated with the first telephony device based on the first number by querying the multimedia client database;
determine an information address from which information can be accessed;
effect delivery of the information address to the first multimedia client using the first address, such that the information can be accessed by the first multimedia client using the information address; and
send the first address to a second multimedia client associated with the second telephony device and send the information address to the second multimedia client to effect delivery of the information address to the second multimedia client, which can forward the information address to the first multimedia client using the first address; and
receive an indication that the called party wants to effect delivery of the information address to the caller prior to effecting delivery of the information address, wherein the indication that the called party wants to effect delivery of the information address is received via the second multimedia client.

19. The system of claim 18 wherein the service node is further adapted to send the information address to the first multimedia client using the first address.

20. The system of claim 18 wherein the indication that the called party wants to effect delivery of the information address is received via a telephony switch servicing the second telephony device.

21. The system of claim 20 wherein the indication that the called party wants to effect delivery of the information address is a feature code or verbal command provided by the called party via the second telephony device.

22. The system of claim 18 wherein the service node is further adapted to:
   automatically determine an automated information address from which automated information can be accessed; and
   automatically effect delivery of the automated information address to the first multimedia client using the first address, such that the automated information can be accessed by the first multimedia client using the automated information address.

23. The system of claim 18 wherein the information address is associated with the second number in a second database and wherein the service node is further adapted to access the second database using the second number to determine the information address.

24. The system of claim 18 wherein the first address is associated with the first number in the multimedia client database and wherein the service node is further adapted to query the multimedia client database by accessing the multimedia client database using the first number to determine the first address.

25. The system of claim 18 wherein the message is received via a telephony switch servicing the second telephony device.

26. The system of claim 18 wherein the information is related to the called party.

27. The system of claim 18 wherein the information includes a location of the called party.

28. The system of claim 18 wherein the information includes a location of the caller.

29. The system of claim 18 wherein the information includes directions to a location associated with the called party.

30. A method comprising:
   registering a combined client with a multimedia client database;
   receiving a message indicating a voice call is being initiated by a caller from a first telephony device associated with a first number to a called party at a second telephony device associated with a second number, wherein the first telephony device is part of the combined client;
   determining a first address for a first multimedia client associated with the first telephony device based on the first number by querying the multimedia client database;
   determining a first information address from which first information can be accessed;
   effecting delivery of the first information address to the first multimedia client using the first address, such that the first information can be accessed by the first multimedia client using the first information address;
   receiving indication that the called party wants to effect delivery of a second information address;
   determining the second information address from which second information can be accessed;
   effecting delivery of the second information address to the first multimedia client using the first address, such that the second information can be accessed by the first multimedia client using the second information address; and
   sending the first address to a second multimedia client associated with the second telephony device and wherein delivery of the first and second information addresses is effected by sending the first and second information addresses to the second multimedia client, which can forward the first and second information addresses to the first multimedia client using the first address; and
   receiving indication that the called party wants to authorize and effect delivery of the first and second information addresses to the caller prior to effecting delivery of the information addresses, wherein the indication that the called party wants to authorize and effect delivery of the information address is received via the second multimedia client.

31. The method of claim 30 wherein delivery of the first and second information addresses is effected by sending the first and second information addresses to the first multimedia client using the first address.

* * * * *